US006970169B1

(12) United States Patent
Harris (10) Patent No.: US 6,970,169 B1
(45) Date of Patent: Nov. 29, 2005

(54) DIGITALLY SYNTHESIZING SEAMLESS TEXTURE HAVING RANDOM VARIATIONS

(75) Inventor: Jerry Harris, Newberry, FL (US)

(73) Assignee: Adobe Systems Incorporated, San Jose, CA (US)

( * ) Notice: Subject to any disclaimer, the term of this patent is extended or adjusted under 35 U.S.C. 154(b) by 247 days.

(21) Appl. No.: 10/254,213

(22) Filed: Sep. 24, 2002

(51) Int. Cl.[7] .............................................. G06T 11/20
(52) U.S. Cl. ...................... 345/440; 345/582; 345/441
(58) Field of Search ............................... 345/440–443, 345/467, 582–588, 629

(56) References Cited

U.S. PATENT DOCUMENTS

| | | |
|---|---|---|
| 4,956,872 A | 9/1990 | Kimura |
| 5,182,548 A | 1/1993 | Haeberli |
| 5,347,620 A | 9/1994 | Zimmer |
| H1506 H | 12/1995 | Beretta |
| 5,500,925 A | 3/1996 | Tolson |
| 5,513,991 A | 5/1996 | Reynolds et al. |
| 5,611,036 A | 3/1997 | Berend |
| 5,646,650 A | 7/1997 | Miller et al. |
| 5,761,401 A * | 6/1998 | Kobayashi et al. ......... 345/630 |
| 5,767,860 A | 6/1998 | Zimmer et al. |
| 5,828,819 A | 10/1998 | Do et al. |
| 5,831,632 A | 11/1998 | Schuster et al. |
| 5,835,086 A | 11/1998 | Bradstreet et al. |
| 5,844,565 A | 12/1998 | Mizutani et al. |
| 5,847,712 A | 12/1998 | Salesin et al. |
| 5,852,673 A | 12/1998 | Young |
| 5,870,091 A | 2/1999 | Lazarony, Jr. et al. |
| 5,883,636 A | 3/1999 | Hayashi et al. |
| 5,909,220 A | 6/1999 | Sandow |
| 5,926,186 A | 7/1999 | Itoh et al. |
| 5,940,081 A | 8/1999 | Guo et al. |
| 5,986,665 A | 11/1999 | Wrey et al. |
| 6,011,536 A | 1/2000 | Hertzmann et al. |
| 6,067,094 A | 5/2000 | Schuster |
| 6,226,000 B1 | 5/2001 | Richens |
| 6,239,803 B1 | 5/2001 | Driskell |
| 6,268,865 B1 * | 7/2001 | Daniels et al. .............. 345/582 |
| 6,298,489 B1 | 10/2001 | Cox |
| 6,310,622 B1 | 10/2001 | Asente |
| 6,329,990 B1 | 12/2001 | Silverbrook et al. |
| 6,373,490 B1 * | 4/2002 | Bendiksen et al. ......... 345/441 |
| 6,457,034 B1 * | 9/2002 | Morein ....................... 708/490 |
| 6,728,965 B1 * | 4/2004 | Mao ............................ 725/38 |

FOREIGN PATENT DOCUMENTS

| | | |
|---|---|---|
| EP | 0 678 831 A2 | 10/1995 |
| EP | 0 881 597 A2 | 2/1998 |
| EP | 0 854 637 A2 | 7/1998 |

OTHER PUBLICATIONS

U.S. Appl. No. 09/299,294, filed Apr. 26, 1999, Schuster et al.

(Continued)

*Primary Examiner*—Matthew C. Bella
*Assistant Examiner*—Po-Wei (Dennis) Chen
(74) *Attorney, Agent, or Firm*—Fish & Richardson P.C.

(57) ABSTRACT

Methods and apparatus for digitally synthesizing non-uniform and seamless images representing textured marks. A method for rendering a mark in a graphics application includes receiving information specifying a mark and generating a representation of the mark based on the received information. The representation includes a sequence of one or more pattern instances. Each pattern instance is selected from a collection of patterns. Each pattern in the collection of patterns includes an arrangement of graphical elements and, furthermore, is selectable while the second component is being generated. The collection of patterns incorporates some variation among the arrangement of graphical elements of the patterns of the collection.

36 Claims, 6 Drawing Sheets

OTHER PUBLICATIONS

Fractal Design Expression: User Guide for Macintosh® and Windows®, Fractal Design Corporation, ©1996, pp. 155-163.

Fractal Design Expression: Creative Techniques Guide for Macintosh® and Windows®, Fractal Design Corporation, ©1996, pp. 1-5.

Fractal Design Expression: User Guide for Macintosh® and Windows®, Fractal Design Corporation, ©1996, pp. 2-3, 11-12, 14-15, 17, 53-55, 60, 92-96, 102-108, 115-122.

Adobe After Effects®, User Guide for use with Apple Macintosh Computers, version 3.0, Adobe® Systems Incorporated, 1994-1995, pp. 283-303.

Free Hand 5.0 User Manual, Macromedia, Chapters 3, 5, 7, pp. 58-179, 1991.

Hertzmann, "Painterly Rendering With Curved Brush Strokes of Multiple Sizes", Computer Graphics Proceedings, 1998, pp. 453-460.

Meier, "Painterly Rendering for Animation", Computer Graphics Proceedings, 1996, pp. 477-484.

Haeberli, "Paint By Numbers: Abstract Image Representations", Computer Graphcis, vol. 24, No. 4, Aug., 1990, pp. 207-214.

Salisbury, et al., "Orientable Textures for Image-Based Pen-and-Ink Illustration", Computer Graphics Proceedings, 1997, pp. 401-406.

Curtis et al., Computer-Generated Watercolor:, Computer Graphics Proceedings, 1997, pp. 421-430.

Litwinowicz, Peter, "Processing Images and Video for an Impressionist Effect", 1997, Proceedings of the 24th Annual Conference on Computer Graphics and Interactive Techniques, 9 pages.

* cited by examiner

Component 1 Tip & Stroke

Component 2 Tip & Stroke

Multiply Textured Mark

Darken Textured Mark

Overlay Textured Mark

Color Dodge Textured Mark

Color Burn Textured Mark

Linear Burn Textured Mark

Hard Mix Textured Mark

DIGITALLY SYNTHESIZING SEAMLESS TEXTURE HAVING RANDOM VARIATIONS

BACKGROUND OF THE INVENTION

The present invention relates to digital imagery.

Traditional illustration media usually have texture, which refers to a characteristic visual and tactile quality of a particular medium. Paper, for example, has texture in the form of ridges formed by interlocking fibers. Similarly, canvas has texture in the form of ridges formed by interwoven fibers.

The texture of most media exhibits some degree of random variation in at least some aspects. For example, the ridges present in paper vary in aspects such as orientation, location, size, and shape. Even the ridges formed by the interwoven fibers of canvas, which are typically oriented in a same general direction, can exhibit random variation in aspects such as size, color, and shape. Media having texture, whether random or not, will be referred to in this specification as textured media.

A mark is an impression left on a medium as a result of an instance of an application of a marking tool, such as a pencil or paint brush. A mark can be as simple as a dot, spot, or stamp resulting from a quick touch of the tool to the surface of the medium. A mark can also be a line that results from the movement of the tool across the medium while the tool is in contact with the medium. Marking on textured medium usually produces a mark that derives at least some texture from the textured medium. A watercolor mark, for example, usually derives texture from the paper on which the mark is made because the watercolor pigment used to make the mark conforms to and bleeds into the texture of the paper. In addition to deriving texture from the medium on which it was made, a mark may also derive texture from the marking medium, such as pigment, being used. For example, a mark made with oil paint, which is a type of pigment, can develop texture when the oil paint dries and cracks. A mark having texture, such as one that derives texture from textured media, will be referred to in this specification as a textured mark.

A system for generating digital imagery can model and render images of marks in response to user input specifying the marks. Additionally, the system can render an image that shows an accumulation of the specified marks. An image that shows an accumulation of marks specified by a user input will be referred to in this specification as a final image.

One way the system models and renders an image of a mark is to define a stroke that is a representation of the mark. Such systems define a stroke as a sequence of tips delimited by a starting point and an ending point of the stroke. A tip is a representation of a stamp of a marking tool and, furthermore, has an outline that corresponds to the outline of the stamp. For example, a tip representing a stamp made by a pencil is a dot. The outline of the tip, in this example, is a circle. A stroke can include information that specifies an appearance of the mark, such as but not limited to position, opacity, and color information.

SUMMARY OF THE INVENTION

The present invention provides methods and apparatus, including computer program products, for digitally synthesizing seamless texture having random variations.

In general, in another aspect, a method for rendering a mark in a graphics application includes receiving information specifying a mark and generating a representation of the mark based on the received information. The representation includes a sequence of one or more pattern instances. Each pattern instance is selected from a collection of patterns. Each pattern in the collection of patterns includes an arrangement of graphical elements and, furthermore, is selectable while the second component is being generated. The collection of patterns incorporates some variation among the arrangement of graphical elements of the patterns of the collection.

In general, in another aspect, a computer program product, for rendering a mark, includes instructions to cause a processor to receive information specifying a mark and, furthermore, to generate a representation of the mark based on the received information. The representation includes a sequence of one or more pattern instances. Each pattern instance is selected from a collection of patterns. Each pattern in the collection of patterns includes an arrangement of graphical elements and, furthermore, is selectable while the second component is being generated. The collection of patterns incorporates some variation among the arrangement of graphical elements of the patterns of the collection.

In one implementation, a paint program in accordance with the invention models and renders an image of a textured mark by rendering two separate strokes into two memory portions, such as two buffers, while tracking a user's manipulation of an input device, such as a stylus or mouse. The first memory portion accumulates a sequence of round Gaussian-shaped tips. The second memory portion accumulates a sequence of tips, with each tip including some representation of texture. Tips including some representation of texture will be referred to in this specification as textured tips. The system arbitrarily rotates at least some of these textured tips with respect to a point of reference. The system combines by, for example, blending the first and second memory portions, thus producing a stroke having texture (i.e., a textured stroke) that is seamless and, furthermore, that includes random variations.

The invention can be implemented to realize one or more of the following advantages. A system in accordance with the invention produces a natural and realistic representation of a textured mark. The representation includes texture that is seamless and, furthermore, that includes random variations in one or more aspects such as structure size, orientation, color, and shape.

The system employs a scalable technique for synthesizing a texture mark by scaling the component defined as a sequence of non-textured tips. By doing so, the system does not need to scale the component defined as a sequence of textured tips, which scaling consumes significant amount of computing resources. The system, thus, reduces the amount of computing resources consumed.

The system does not need to use a tessellated texture pattern which produces seams. Nor does the system need to use a single, large texture pattern which consumes a great amount of memory and which may not scale well to an image of indeterminate size.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
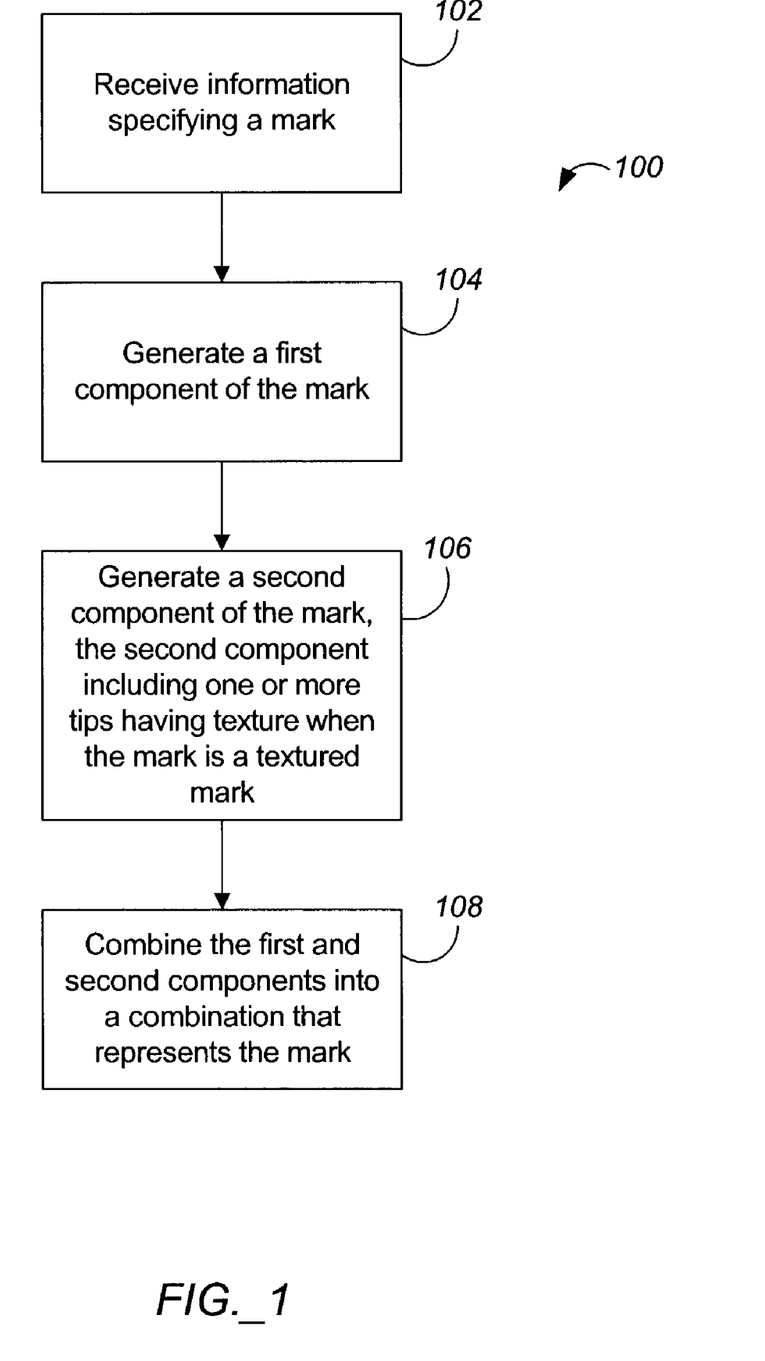
FIG. 1 is a flow diagram illustrating a method for generating a mark.

FIG. 1 illustrates a method 100 for generating a representation of a mark. A system performing method 100 receives information that specifies a mark to be rendered (step 102). The information specifies a starting point and an ending point, as well as the dimensions of the mark. Optionally, the information also specifies a marking tool, such as a paint brush or a pencil, to be simulated. Alternatively, the marking tool can be specified apart from the information specifying the mark, such as by a user's selection of an icon representing a desired marking tool in a graphical user interface. The information optionally specifies other aspects of the mark such as a color and opacity of the mark, a particular illustration medium that is being simulated, an angle of the marking tool with respect to the illustration medium (i.e., the tilt), and an amount of pressure being exerted on the marking tool.

The system receives the information from user input through a user interface. The user interface includes an input device, such as a stylus or a mouse, which controls the simulated marking tool. Alternatively, the system can receive the information from any other input, such as a computer program product.

The system generates a first component of the mark (step 104). The system defines the first component as a sequence of one or more tips. The system associates with each tip at least one of the above described aspects of the mark. For example, the system can associate with each tip data specifying the location and dimension of the mark. The location data can, for example, specify where in a final image the system renders the tip. The dimension data can, for example, specify the outline shape and size of the tip.

The system defines the data associated with each tip in accordance with the received information. For example, the system can select an outline shape of a tip based on the marking tool specified in the received information. The tips can have any outline, such as a polygon, a circle, or an oval.

Optionally, a tip can include a spatial distribution of some aspect of the mark, such as color. The distribution function can, for example, simulate the absorption of some particular pigment onto some particular medium. The system can use any distribution function, such as a Gaussian or other function. Tips having a Gaussian distribution of some aspect will be referred to in this specification as a Gaussian-shaped tip.

Optionally, the system scales the first component based on the received information. For example, when the marking tool is tilted, the system scales the tip to reflect the outline shape of the mark made by the tilted marking tool. Scaling can include sizing as well as shaping.

As an alternative to defining the first component as a sequence of one or more tips, the system can define the first component analytically by, for example, using one or more mathematical expressions to describe aspects of the mark. For example, the system can use one expression to describe the dimension of the mark and another expression to describe the color of the mark. In general, the system can use any known technique to define a component of the mark.

Figure 2:
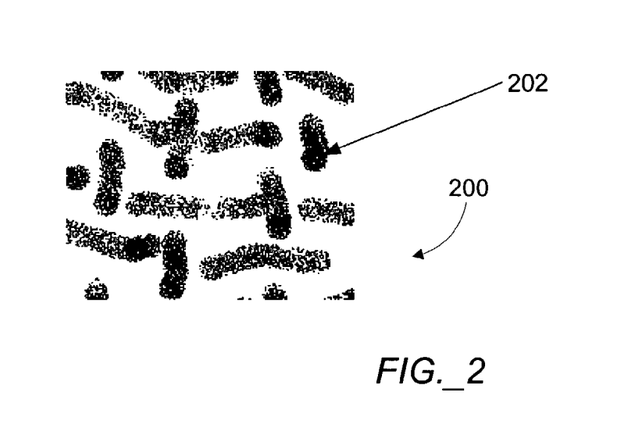
FIG. 2 shows an example of an arrangement of graphical elements.
Figure 3:
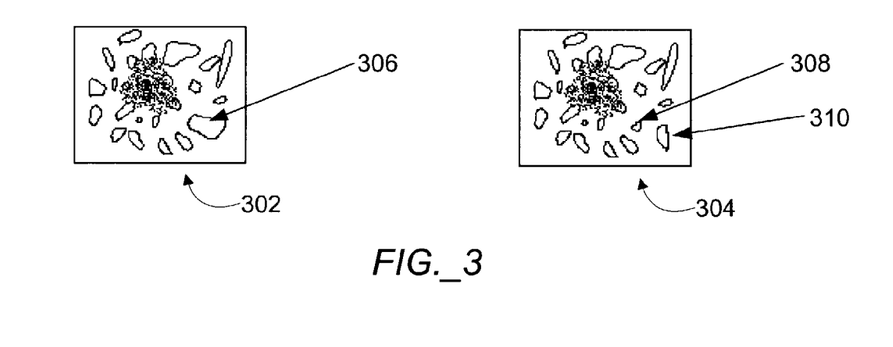
FIG. 3 shows an example of the variation among the arrangements of graphical elements of two pattern instances.

To simulate a textured mark, the system generates a second component of the mark (step 106). The system defines the second component as a sequence of one or more textured tips. The system generates each textured tip by defining the tip as, for example, a polygon and mapping a pattern instance to the polygon. Each textured tip can thus include a pattern instance. Each pattern instance is selected from a collection of patterns. Each pattern in the collection of patterns includes an arrangement of graphical elements. FIG. 2 shows an example of one arrangement 200 of graphical elements forming a pattern. Item 202 is one graphical element of the arrangement. Typically, each pattern in the collection of patterns is selectable while the system is generating the second component. The collection of patterns incorporates some variation among the arrangement of graphical elements of the patterns of the collection. FIG. 3 shows an example of variation between two patterns, a pattern 302 and a pattern 304. The graphical element 306 of the pattern 302 is replaced, in the pattern 304, with the graphical elements 308 and 310. Other variation are possible. For example, the patterns can have the same graphical elements but some of the graphical elements may be situated different by being in a different position or by having a different orientation.

Figure 4:
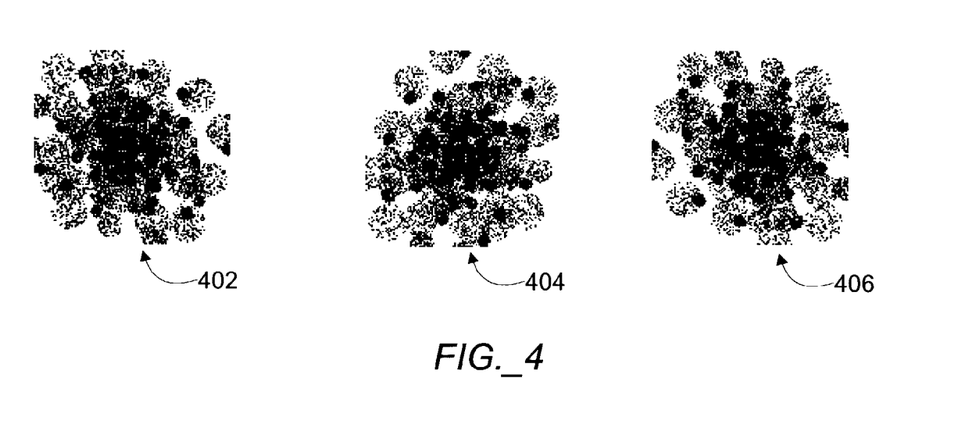
FIG. 4 shows an example of a pattern template and two pattern instances generated by rotating the pattern template.

The selection of a pattern instance from the collection of patterns can include generating a pattern instance based on a pattern template that includes one or more graphical elements. For example, to generate a pattern instance, the system can rotate an arrangement of graphical elements defined in the pattern template. This technique requires that the graphical elements of the pattern template to be rotated not be radially symmetrical. FIG. 4 shows an example of a pattern template and two instances generated by rotating the pattern template. Item 402 is an example of a pattern template. Items 404 and 406 are examples of pattern instances generated by rotating the pattern template 402. In general, the rotation can be random or pseudo-random so that one pattern instance exhibits random or pseudo-random variation from another pattern instance in the sequence of textured tips. Alternatively, to generate a pattern instance, the system can generate an arrangement of graphical elements that are defined in the pattern template. Like the rotation technique, the generation technique can also be random or pseudo-random. In either case, the patterns of the collection need not be predefined and the system need not store the collection of predefined pattern. The system need only store the pattern template and generate the patterns of the collection from the pattern template.

Figure 5:
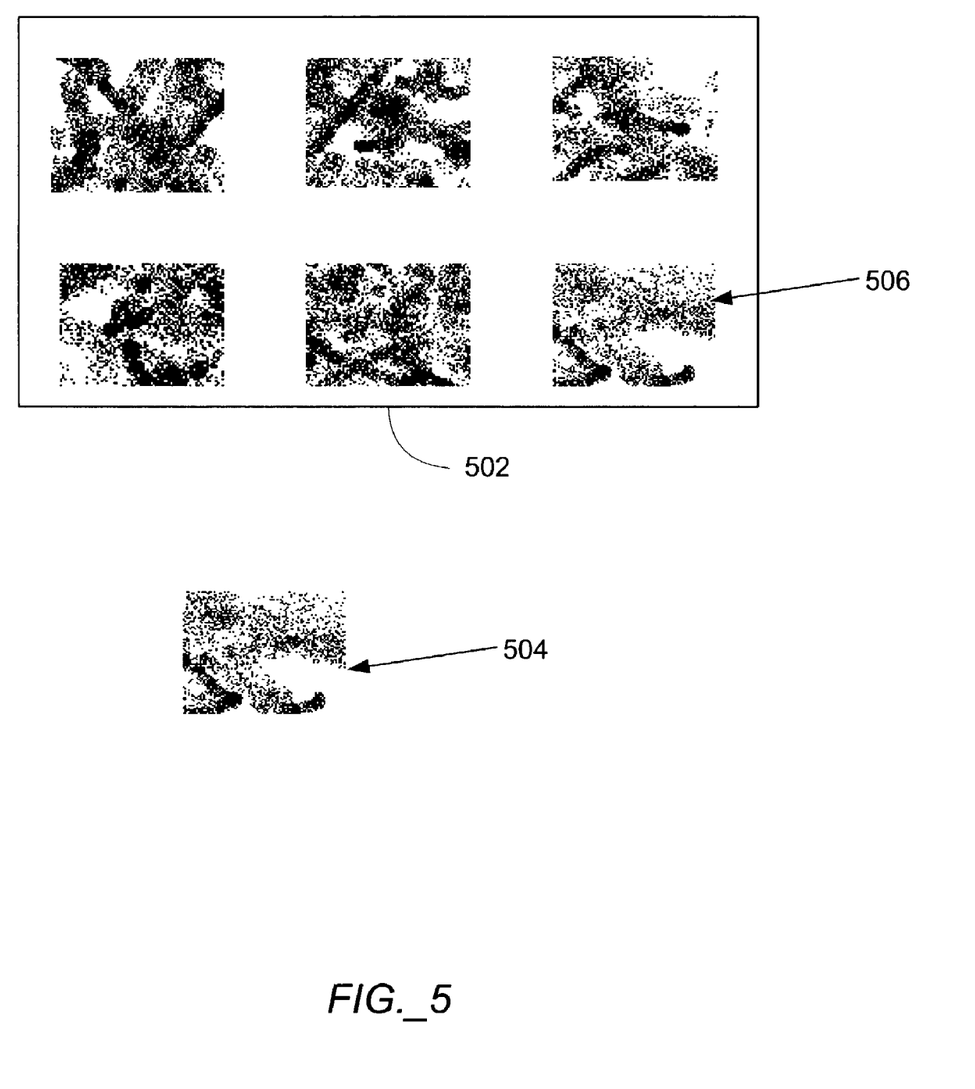
FIG. 5 shows an example of a collection of predefined patterns and a pattern instance that is selected from one of the predefined patterns.

The selection of a pattern instance from a collection of patterns can also include selecting a predefined pattern from a collection of predefined patterns that are stored in memory. FIG. 5 shows an example of a collection 502 of predefined patterns and a pattern instance 504 that is selected from one of the predefined patterns, pattern 506. The difference between this technique and the one described above is that, in the previously described technique, the system does not need to have a collection of predefined patterns. Rather, in that case, the system stores only one predefined pattern, the pattern template, and generates pattern instances based on the pattern temple. Here, the system does have a collection of predefined patterns that are stored in memory. To select a pattern instance the system simply selects, e.g., randomly or pseudo-randomly, one of the predefined patterns of the collection. No generation is thus required. In general, the first technique consumes less memory but more processing resources than does the second.

The system can select the patterns to simulate a particular texture. To do so, the system can include more than one collection of patterns. The patterns in each collection can represent a particular type of texture. Thus, the system can select patterns having graphical elements that simulate the texture of the textured mark as specified by the information received in step 102. For example, if the received information specifies a water color mark on paper, the system selects a pattern from the collection of patterns made up of graphical elements that reflects texture usually produced by touching a brush, dipped in water-color paint, onto paper. The graphical elements, in this case, represent ridges of paper fibers. While the graphical elements can represent the texture of a traditional medium, they can also represent an abstract texture, or some other source of variation in the mark, such as random noise.

For some or all of the one or more textured tips in the sequence, the system can select different patterns so that at least some of the textured tips differ from each other. One technique for selecting different patterns is to generate different pattern instances having variations among the arrangement of graphical elements as discussed above. The system can further select patterns so that at least some of the textured tips differ randomly or pseudo-randomly. One technique for incorporating randomness is to randomly generate pattern instances as described above.

The system combines the first and second component into a combination that represents the mark (step 108). The system combines the components instantaneously, i.e., as the components are accumulated. Alternatively, the system can combine accumulated portions of the components in batches.

The system can accumulate the first component, second component, and combination in memory, which can include, e.g., a buffer, a stack, or a cache. Alternatively, the system can accumulate the first and second components in memory and output the combination to an output stream. The system can render the combination for display on an output device.

Figure 6:
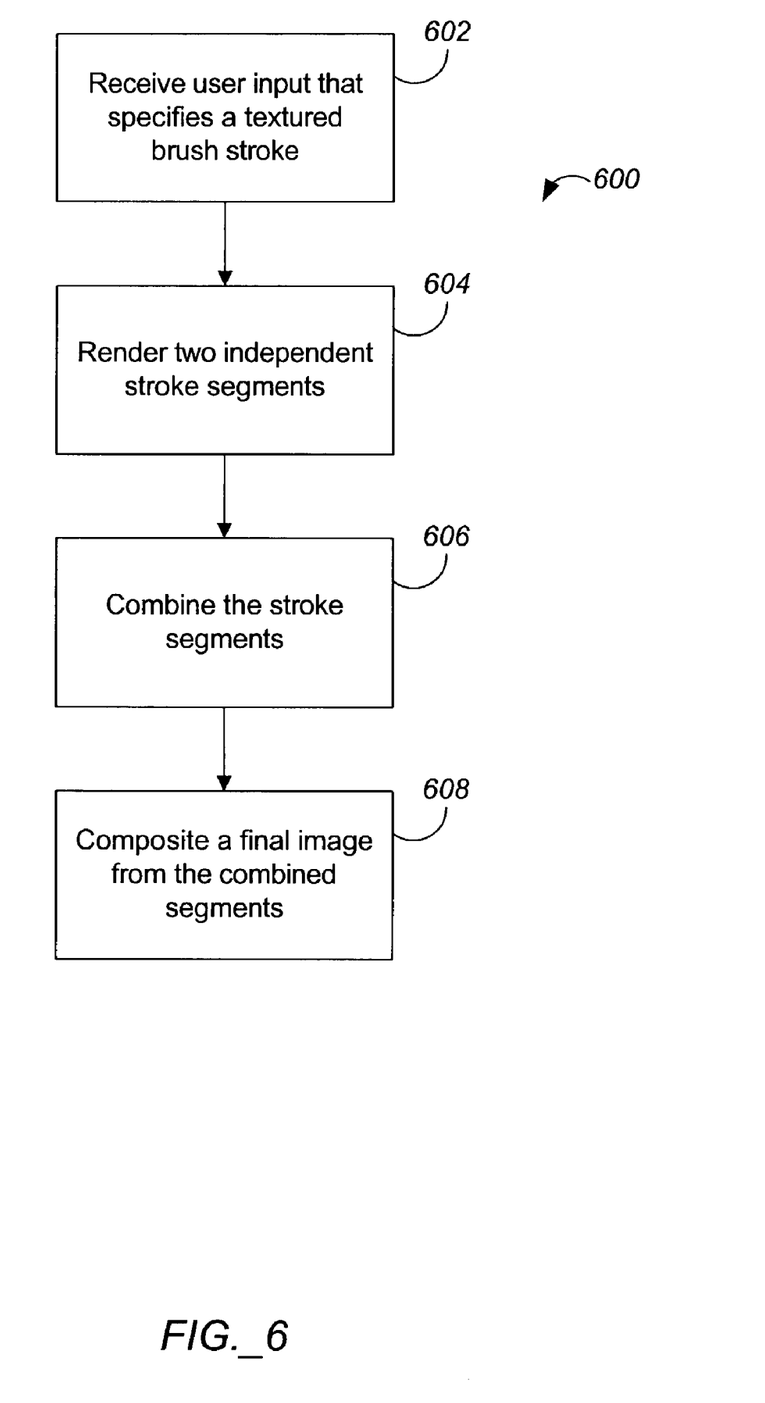
FIG. 6 is a flow diagram illustrating an implementation of the method of FIG. 1.

FIG. 6 is a flow diagram illustrating an implementation of the method of FIG. 1. A digital paint system performing method 600 receives user input that specifies a textured mark (step 602). The user input includes the user's interactions with an input device such as a mouse or graphics tablet. The system tracks these interactions as a series of points and variable properties, such as tilt, pressure, and time stamps, that are associated with each point. Each pair of consecutive points delimits a segment of a stroke (i.e., a stroke segment) that represents a corresponding portion of the textured mark.

For each pair of points, i.e., for each stroke segment, that the user specifies, the system renders two component stroke segments into two single-channel multi-bit buffers (step 604). The first buffer accumulates a first component stroke segment defined as a sequence of evenly spaced and Gaussian-shaped brush tips. Alternatively, the Gaussian-shaped brush tips need not be evenly spaced but can be spaced based on, e.g., the speed of and pressure exerted on the input device. The brush tips need not be Gaussian-shaped but, alternatively, can be represented by any distribution function. The outline of the tip can be any shape such as a polygon. The brush tips can vary in size, opacity, angle, and roundness, depending on properties such as speed, pressure, and tilt of the input device. To calculate properties for each accumulated brush tip, the system can interpolate the values of properties of the start and end points that delimit the stroke segment. The system places the brush tips at fractional positions between the pair of points defining the current stroke segment.

The system accumulates each brush tip in the first buffer through a blending operation such as a multiply mode or an add mode. Table 1 shows example pseudo code of the mentioned blend modes. The system can use other blend modes. Blending is further described in commonly assigned U.S. Pat. No. 6,421,460, issued on Jul. 16, 2002, which is hereby incorporated by reference in its entirety.

TABLE 1

Multiply mode:
NewBufferValue = Brush Value + (1 − Brush Value)*CurrentBufferValue
Add mode:
NewBufferValue = CurrentBufferValue + BrushValue The second buffer accumulates a second component stroke segment. The system accumulates a sequence of textured brush tips in the second buffer through blend operations such as those described.

The second stroke component exhibits an aggregate texture that is the combination of textures of each one of the sequence of textured brush tips. To produce random variation in the aggregate texture of the second stroke component, the system randomly generates differences between or among at least some of the textured tips. As discussed above, one way to generate such differences is to rotate a single texture polygon, which is a polygon having a pattern of graphical elements, and map each rotated texture polygon to the various textured tips of the sequence of textured tips. This mapping technique is referred to as texture mapping.

Alternatively, instead of rotating a texture polygon and then texture mapping, the system can precompute and store, in a cache for example, a set of different texture polygons and map the different texture polygons onto various of the textured tips. This alternative improves the system's computing performance but reduces visual fidelity.

The system can optionally scale the textured tip by storing it, for example, as a MipMap, which incorporates a pyramidal technique. Alternatively, the system can use any other pyramidal scheme to scale.

The system combines the first and second component stroke segments into a third buffer (step 606). The system combines with blending operations such as multiply, overlay, dodge texture-smooth, dodge smooth-texture, burn texture-smooth, burn smooth-texture, and add. The system uses the contents of the third buffer to composite a source of color onto a final image that reflects an accumulation of all the brush strokes that the user has specified. The source of color can be, for example, a single constant color, a tessellated pattern, a cloned image area, or a gradient. The final image can include an alpha channel to specify opacity in addition to the described color channels.

Figure 7:
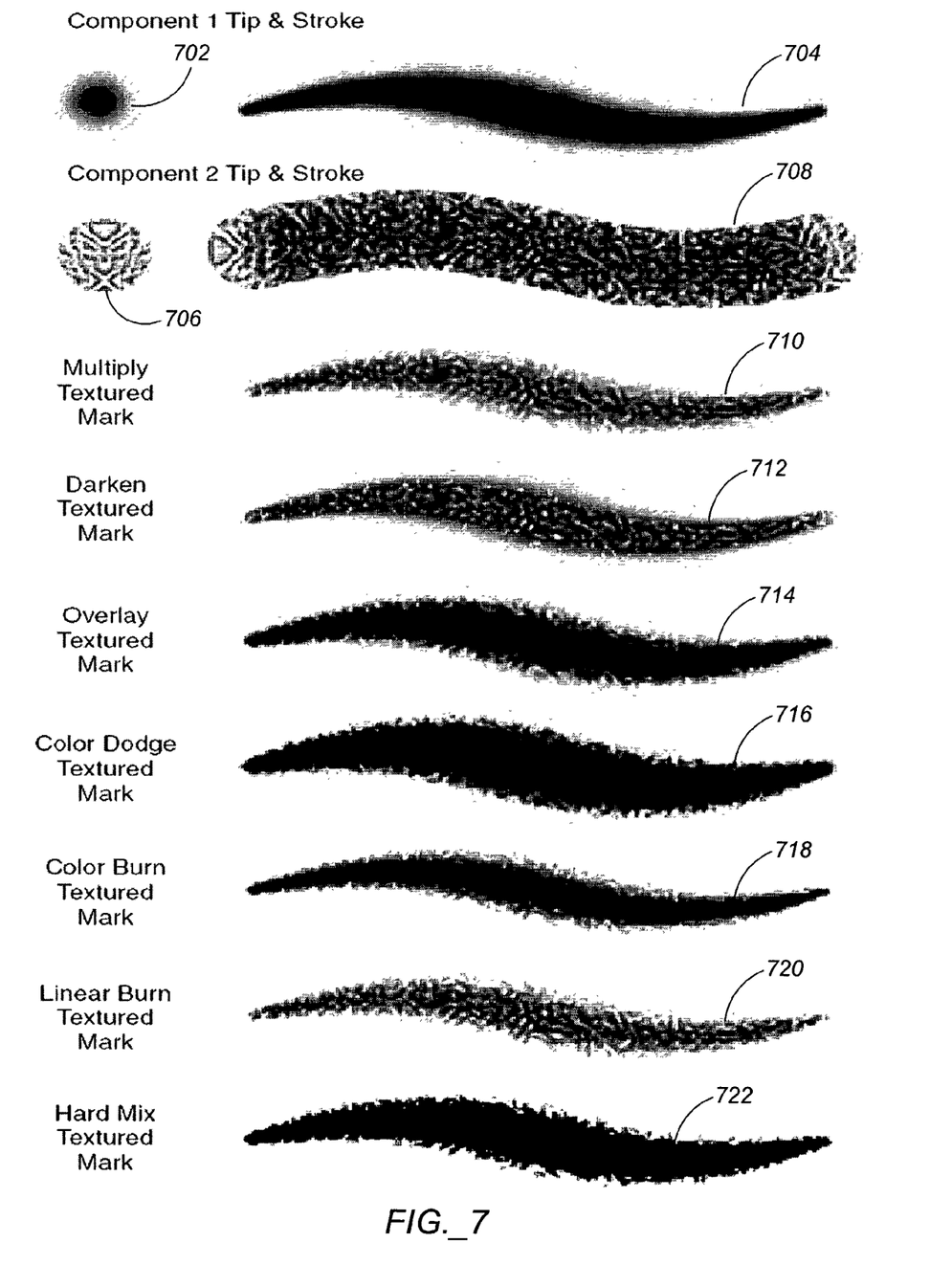
FIG. 7 shows examples of a first and second component and their various combinations.

FIG. 7 shows examples of a first component 704, derived from a Gaussian-shaped tip 702, and a second component 708, derived from a textured tip 706. Strokes 710–722 illustrate various combinations of the first component 704 and the second component 708.

Figure 8:
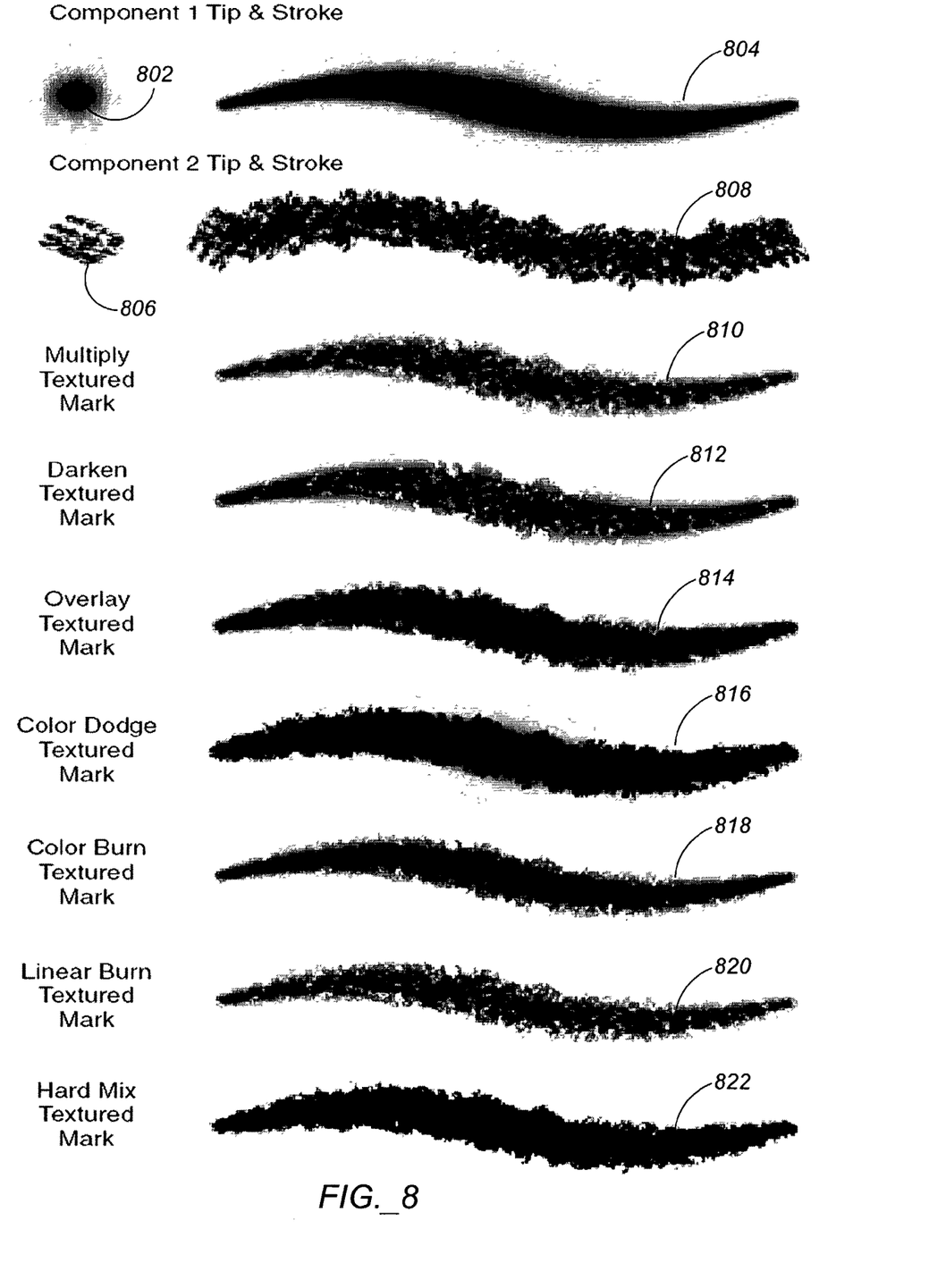
FIG. 8 shows examples of another first and second component and their various combinations.

Similarly, FIG. 8 shows examples of a first component 804, derived from a Gaussian-shaped tip 802, and a second component 808, derived from a textured tip 806. Strokes 810–822 illustrate various combinations of the first component 804 and the second component 808. In this example, as well as the example of FIG. 7, the first component is scaled while the second component is not. As discussed above, not scaling the second component reduces consumption of computing resources.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention has been described in terms of particular embodiments. Other embodiments are within the scope of the following claims. For example, the steps of the invention can be performed in a different order and still achieve desirable results. The system can, for example, render the second compoenent before rendering the first component. The system is not limited to defining the first component as a series of Gaussian-shaped tips; the system can use any type of tips to define the first component. The system can include, in addition to those described, any other aspect of a mark in the first component. The system is not limited to blending but can combine the first and second components using any method.

What is claimed is:

1. A method for rendering a mark in a graphics application, the method comprising:
   receiving, in a graphics application program, information specifying a digital mark, the information including path information specifying a path of the digital mark, shape information specifying a shape of the digital mark, and texture information specifying a texture appearance of the digital mark;
   generating a sequence of shaped tips that are positioned based on the path information, the shaped tips being shaped so that their combination has the shape of the digital mark;
   generating a sequence of textured tips that are positioned based on the path information, wherein, for at least one of the textured tips, generating comprises:
      defining a defined outline for the textured tip;
      randomly or pseudo-randomly selecting a selected representation of the texture appearance specified by the texture information; and
      combining the selected representation and the defined outline; and
   combining the sequence of shaped tips and the sequence of textured tips to derive a visual appearance for the digital mark.

2. The method of claim 1, further comprising wherein:
   selecting, based on the texture information, one of two or more sets of representations of texture appearance, the representations in a set being representations for a same texture appearance, and the two or more sets including representations for different texture appearances, wherein randomly or pseudo-randomly selecting a representation includes randomly or pseudo-randomly selecting a representation from the selected set of representations.

3. The method of claims 1, further comprising:
   selecting, based on the texture information, one of two or more templates for generating representations of texture, the representations generated from a same template being representations for a same texture appearance, wherein selecting a representation of texture includes generating a random or pseudo-random representation of texture from the selected template.

4. The method of claim 3, wherein:
   generating a random or pseudo-random representation of the texture from the selected template includes generating a random or pseudo-random arrangement of graphical elements defined in the selected template.

5. The method of claim 1, further comprising:
   selecting, based on the texture information, one of two or more representations of texture, wherein randomly or pseudo-randomly selecting a representation of texture includes randomly or pseudo-randomly rotating the representation of the texture.

6. The method of claim 1, wherein:
   selecting a representation of texture includes selecting from among or between pre-existing representations.

7. The method of claim 1, further comprising:
   scaling the shaped tips but not the textured tips.

8. The method of claim 1, wherein:
defining a sequence of shaped tips includes defining a shaped tip that has a Gaussian-shaped outline.

9. The method of claim 1, further comprising:
accumulating the sequence of shaped tips into a first buffer and accumulating the sequence of textured tips into a second buffer.

10. The method of claim 9, further comprising:
accumulating, into a third buffer, a result of combining the sequence of shaped tips and the sequence of textured tips.

11. The method of claim 10, wherein:
accumulating includes instantaneously accumulating.

12. The method of claim 9, wherein:
the first and second buffers are single channel multipart buffers.

13. The method of claim 1, wherein:
combining includes blending.

14. The method of claim 13, wherein blending includes:
multiplying, overlaying, dodge-textured smoothing, dodged-smooth texturing, burn-textured smoothing, burn-smooth texturing, or adding.

15. The method of claim 1, wherein:
path information includes information specifying a start point of the digital mark, an end point of the digital mark, and points between the start and end points;
shape information includes information specifying a pressure exerted on an input device and a tilt angle of the input device; and
texture information includes information specifying a marking tool to be simulated or a medium to be simulated.

16. The method of claim 1, wherein receiving information specifying a digital mark includes:
receiving information specifying the digital mark while the digital mark is being defined.

17. The method of claim 16 wherein receiving information specifying a digital mark while the digital mark is being defined includes:
receiving information from an input device being controlled by a person.

18. The method of claim 17, further comprising:
recording information from the input device while the person is defining the digital mark and at a plurality of sampling points;
interpolating information between sampling points; and
applying the interpolated information between sampling points.

19. A computer program product, tangibly stored on machine-readable medium, for rendering a mark, the product comprising instructions to cause a processor to:
receive, in a graphics application program, information specifying a digital mark, the information including path information specifying a path of the digital mark, shape information specifying a shape of the digital mark, and texture information specifying a texture appearance of the digital mark;
generate a sequence of shaped tips that are positioned based on the path information, the shaped tips being shaped so that their combination has the shape of the digital mark;
generate a sequence of textured tips that are positioned based on the path information, wherein, for at least one of the textured tips, generating comprises:
defining a defined outline for the textured tip;
randomly or pseudo-randomly selecting a selected representation of the texture appearance specified by the texture information; and
combining the selected representation and the defined outline; and
combine the sequence of shaped tips and the sequence of textured tips to derive a visual appearance for the digital mark.

20. The product of claim 19, further comprising instructions to:
select, based on the texture information, one of two or more sets of representations of texture appearance, the representations in a set being representations for a same texture appearance, and the two or more sets including representations for different texture appearances, wherein randomly or pseudo-randomly selecting a representation includes randomly or pseudo-randomly selecting a representation from the selected set of representations.

21. The product of claim 19, further comprising instructions to:
select, based on the texture information, one of two or more templates for generating representations of texture, the representations generated from a same template being representations for a same texture appearance, wherein selecting a representation of texture includes generating a random or pseudo-random representation of texture from the selected template.

22. The product of claims 21, further comprising instructions to wherein:
generating a random or pseudo-random representation of the texture from the selected template includes generating a random or pseudo-random arrangement of graphical elements defined in the selected template.

23. The product of claim 21, further comprising instructions to:
select, based on the texture information, one of two or more representations of texture, wherein randomly or pseudo-randomly selecting a representation of texture includes randomly or pseudo-randomly rotating the representation of the texture.

24. The product of claim 19, wherein:
selecting a representation of texture includes selecting from among or between pre-existing representations.

25. The product of claim 19, further comprising instructions to:
scale the shaped tips but not the textured tips.

26. The product of claims 19, wherein:
defining a sequence of shaped tips includes defining a shaped tip that has a Gaussian-shaped outline.

27. The product of claim 19, further comprising instructions to:
accumulate the sequence of shaped tips into a first buffer and accumulating the sequence of textured tips into a second buffer.

28. The product of claim 27, further comprising instructions to:
accumulate, into a third buffer, a result of combining the sequence of shaped tips and the sequence of textured tips.

29. The product of claim 28, wherein:
instructions to accumulate include instructions to instantaneously accumulate.

30. The product of claim 27, wherein:
instructions to accumulate include instructions to accumulate into buffers that are single channel multipart buffers.

31. The product of claim 19, wherein:
instructions to combine include instructions to blend.

32. The product of claim 31, wherein blending includes:
multiplying, overlaying, dodge-textured smoothing, dodged-smooth texturing, burn-textured smoothing, burn-smooth texturing, or adding.

33. The product of claim 19, wherein:
- path information includes information specifying a start point of the digital mark, an end point of the digital mark, and points between the start and end points;
- shape information includes information specifying a pressure exerted on an input device and a tilt angle of the input device; and
- texture information includes information specifying a marking tool to be simulated or a medium to be simulated.

34. The product of claim 19, further comprising instructions to:
- receive information specifying the digital mark while the digital mark is being defined.

35. The product of claim 34, further comprising instructions to:
- receive information from an input device being controlled by a person.

36. The product of claim 35, further comprising instructions to:
- record information from the input device while the person is defining the digital mark and at a plurality of sampling points;
- interpolate information between sampling points; and
- apply the interpolated information between sampling points.

* * * * *

UNITED STATES PATENT AND TRADEMARK OFFICE
CERTIFICATE OF CORRECTION

| | |
|---|---|
| PATENT NO. | : 6,970,169 B1 |
| APPLICATION NO. | : 10/254213 |
| DATED | : November 29, 2005 |
| INVENTOR(S) | : Jerry Harris |

It is certified that error appears in the above-identified patent and that said Letters Patent is hereby corrected as shown below:

Column 8,
Line 33, delete "wherein";
Line 43, delete "claims" and replace with -- claim --;

Column 10,
Line 24, delete "claims" and replace with -- claim --;
Lines 24-25, delete "further comprising instructions to";
Line 43, delete "claims" and replace with -- claim --.

Signed and Sealed this

Twentieth Day of June, 2006

JON W. DUDAS
*Director of the United States Patent and Trademark Office*